Dec. 11, 1962  G. A. KELLEY ET AL  3,067,468
METHOD FOR EXTRUDING GELATINOUS MATERIALS
Filed July 6, 1959
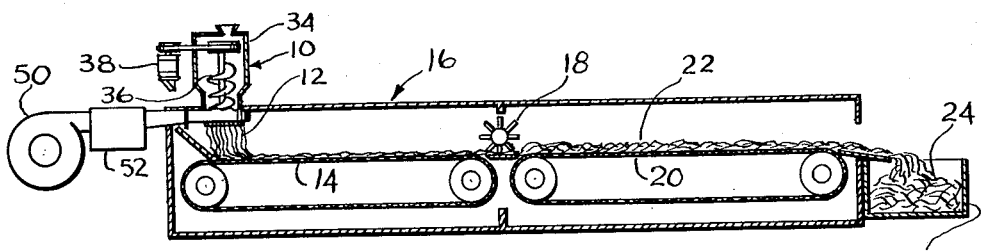
FIG. 1.
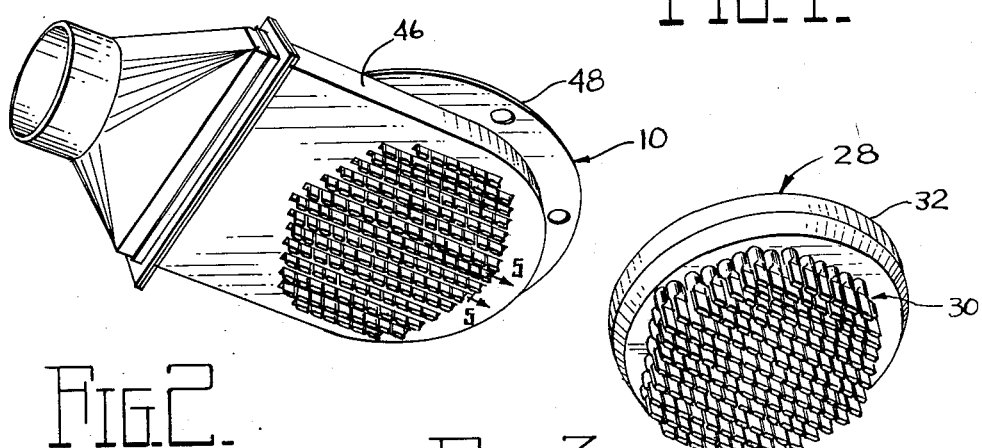
FIG. 2.
FIG. 3.
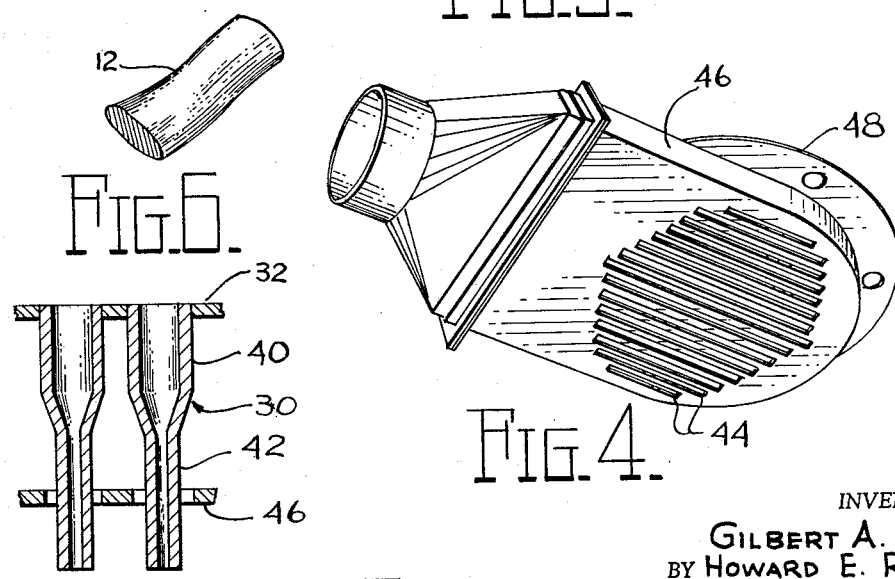
FIG. 6.
FIG. 4.
FIG. 5.
INVENTORS
GILBERT A. KELLEY
BY HOWARD E. RAHM
FRANK B. OATES
ATTORNEY

United States Patent Office 3,067,468
Patented Dec. 11, 1962

3,067,468
METHOD FOR EXTRUDING GELATINOUS MATERIALS
Gilbert A. Kelley, Howard E. Rahm, and Frank B. Oates, Toledo, Ohio, assignors, by mesne assignments, to Midland-Ross Corporation, Cleveland, Ohio, a corporation of Ohio
Filed July 6, 1959, Ser. No. 825,308
5 Claims. (Cl. 18—47.5)

This invention relates to an improvement in processing gelatinous materials and more particularly to an improved method for extruding gelatinous materials.

Gelatinous materials, such as gelatin or animal glue, are usually extracted from raw material as solutions which are subsequently gelled and dried to reduce the weight thereof and to prevent deterioration and growth of bacteria. Accordingly, a solution of a gelatinous material is first cooled to form a gel which is then extruded into noodle-like bodies which are dried by passing dry air therearound as the bodies are carried along a conveyor. The dried bodies are subsequently further processed in a manner which may vary depending on the end product desired.

The present invention relates to an improvement in a method for extrusion of the gel, just before it is deposited on the conveyor for drying. In accordance with the invention, the gel is made into ribbon-like bodies by means of flat nozzles. The ribbon-like bodies present a greater surface area to dry air passing thereover which enables drying to proceed at a faster rate. However, the flattened nozzles apparently also prevent entrapment of air in the bodies, which is desirable because entrapped air tends to cause foaming of the material in some subsequent processing operations. The nozzles are also heated as the gel is extruded thereby to melt a thin layer of gel at the surface of the extruded bodies to produce a glossy surface. The glossy surface, in combination with the flattened shape, causes the material to sparkle, a characteristic which is retained therein even after subsequent processing. This sparkle has been found to be a favorable influence on the sale of end products produced from gelatinous materials.

It is, therefore, a principal object of the invention to provide an improved method for extruding gelatinous materials.

Another object of the invention is to provide an improved method for extruding gelatinous materials into ribbon-like bodies having a high gloss.

Other objects and advantages of the invention will be apparent from the following detailed description of a preferred embodiment thereof, reference being made to the accompanying drawings, in which:

FIG. 1 is a somewhat schematic view, partially in cross section, of apparatus for processing a gelatinous material, which apparatus employs an extruder embodying the principles of the invention;

FIG. 2 is an enlarged view in perspective of a portion of the extruder shown in FIG. 1;

FIG. 3 is a view in perspective of a nozzle assembly forming part of the extruder of FIG. 1;

FIG. 4 is a view in perspective of a plenum chamber housing forming part of the extruder;

FIG. 5 is a fragmentary, enlarged view in cross section taken along the line 5—5 of FIG. 2; and FIG. 6 is a view in perspective of a portion of a gelatinous ribbon produced with the apparatus and according to the method of the invention.

In the processing of gelatin, glue or the like, a gelatinous solution or liquor is super-cooled to cause it to gel, and the gel is extruded into elongate bodies which are deposited on a mesh conveyor in a thin layer. The bodies are then transported through an enclosed zone and dried by means of dry air passed therearound. This process is described in detail in U.S. patent to Peck, No. 2,546,867.

Referring now in more detail to the drawings hereof, FIG. 1 schematically shows apparatus for extruding ribbons of a gel and drying the ribbons. The drying portion of the apparatus is conventional. A super-cooled gelatinous solution or liquor is supplied to an extruder indicated at 10 where it gels, and the gel is delivered as elongate, ribbon-like bodies 12 (see also FIG. 6) to a mesh conveyor belt 14 which carries the ribbon-like bodies 12 to a first drying zone indicated at 16, which may actually include several sub zones. Dry air is supplied to the zone 16 by suitable means (not shown) and is passed around the ribbons 12 which are spread in thin layers on the belt 14. At the end of the zone 16, the ribbons 12, now partially dried, have a tendency to stick together on the belt 14 and, therefore, are broken up by means of a shredder 18. The material is then delivered to a second mesh conveyor belt 20 in a second drying zone 22 where the material is dried completely by dry air passed therearound. The now dried material, indicated at 24, is dumped into a bin 26 or onto another conveyor and carried to storage or to additional processing apparatus.

Referring more particularly to FIGS. 2-5, the extruder 10 includes a nozzle assembly 28 comprising flattened nozzles 30 held in a plate 32 located below an extrusion chamber 34 (FIG. 1). The nozzles 30 are directed downwardly with parallel axes and are spaced apart in both lateral and longitudinal rows. An extruding screw 36 (FIG. 1) in the chamber 34 is driven by a motor 38 to feed to the nozzles 30 the super-cooled gelatinous material, which gels when it is supplied to and expands in the chamber 34. The nozzles 30 include an upper portion 40 (FIG. 5) of circular cross section and a flattened tip portion 42 of elongate cross section with the length of the cross-sectional area at least twice the width. For example, this area can be one-quarter inch wide and one inch long.

The tip portions 42 of the nozzles 30 extend through slots 44 (FIG. 4) in a plenum chamber housing 46 having a flange 48 for connection with the extrusion chamber 34. Heated air at a slightly elevated temperature, for example, 150° F., is supplied to the plenum chamber housing 46 by a blower 50 (FIG. 1) which first passes the air through a heating chamber 52 heated by electrical elements or other suitable sources of heat. The air heats the nozzles 30 and passes out of the slots 44 and around the nozzle tips to prevent the gelatinous material from sticking thereto.

The flattened nozzle portions 42, which form the gelatinous ribbon-like bodies 12, also apparently squeeze entrapped air out of the gelatinous material as it is forced from the circular portion 40 and into the flattened portion 42. The ribbon-like bodies 12 also present a larger surface area to dry air passing therearound and enable the material to be dried more quickly. However, the ribbons 12, even when broken up, retain a flake-like form and have more sparkle than the noodles heretofore known, apparently because the flake-like particles gather and reflect more light than do round particles with roughened surfaces produced from conventional nozzles.

The heated air in the chamber 46 heats the nozzles 30 which in turn heat the surface of the gelatinous material passing therethrough. However, only the surface of the gelatinous material is melted because the material is passed through the nozzles quickly enough that the heat does not penetrate it. The thin layers of molten material quickly gel again after the ribbon-like bodies 12 pass through the heated nozzles 30. This results in a smooth surface which also enhances the sparkle of the bodies 12 and of the finished product.

We claim:

1. In a process of drying gelatinous material which comprises producing a gelatinous solution, super-cooling the solution, gelling the solution, forming the resulting gel into a plurality of elongate, ribbon-like bodies, and spreading and drying the bodies, the improvement comprising flattening the elongate bodies as they are formed, and melting the gel at the surfaces of the bodies as they are formed to produce a gloss thereon.

2. In a process of drying gelatinous material which comprises producing a gelatinous solution, super-cooling the solution, gelling the solution, forming the resulting gel into a plurality of elongate, ribbon-like bodies, and spreading and drying the bodies, the improvement comprising flattening the elongate bodies as they are formed, melting the gel at the surfaces of the bodies as they are formed to produce a gloss thereon, and regelling the molten gel on the surface of the body.

3. In a process of drying gelatinous material which comprises producing a gelatinous solution, super-cooling the solution, gelling the solution, forming the resulting gel into a plurality of elongate, ribbon-like bodies, and spreading and drying the bodies, the improvement comprising flattening the elongate bodies as they are formed, heating the exterior of the elongate bodies, at least during flattening thereof, sufficiently that the exposed surfaces thereof are melted while the interiors thereof remain gelled, and regelling the molten gel on the surface of the body.

4. In a process of drying gelatinous material which comprises producing a gelatinous solution, super-cooling the solution, gelling the solution, forming the resulting gel into a plurality of elongate, ribbon-like bodies, and spreading and drying the bodies, the improvement comprising flattening the elongate bodies as they are formed by passing them through a flattened orifice, heating the exterior of the elongate bodies by supplying heat to the flattened orifice for transfer to the bodies, such heating being sufficient that the exposed surfaces of the flattened bodies are melted while the interiors thereof remain gelled, regelling the molten gel on the surface of the body.

5. A process for producing gelatinous material comprising the steps of: producing a gelatinous solution; super-cooling the solution; gelling the solution; forming the resulting gel into a plurality of elongate bodies; flattening each of the elongate bodies; supplying heat to the surface of each elongate body during both the forming step and the flattening step in sufficient quantity that the exposed surface of each elongate body is melted while the interior thereof remains gelled; regelling the melted surfaces of each elongate body; and spreading and drying the elongate bodies.

References Cited in the file of this patent

UNITED STATES PATENTS

| | | |
|---|---|---|
| 421,700 | Grieser | Feb. 18, 1890 |
| 2,126,869 | Burchenal et al. | Aug. 16, 1938 |
| 2,370,811 | Osgood | Mar. 6, 1945 |
| 2,427,276 | Hagedon | Sept. 9, 1947 |
| 2,546,867 | Peck | Mar. 27, 1951 |
| 2,572,677 | Tench | Oct. 23, 1951 |
| 2,579,815 | Gialanella | Dec. 25, 1951 |
| 2,713,188 | Garvey | July 19, 1955 |